United States Patent
Rajan et al.

(10) Patent No.: US 12,148,429 B1
(45) Date of Patent: *Nov. 19, 2024

(54) SYSTEMS, METHODS, AND STORAGE MEDIA FOR PERFORMING ACTIONS IN RESPONSE TO A DETERMINED SPOKEN COMMAND OF A USER

(71) Applicant: Suki AI, Inc., Redwood City, CA (US)

(72) Inventors: Karthik Rajan, Foster City, CA (US); Sanket Agarwal, San Francisco, CA (US); Baron Reznik, Redwood City, CA (US)

(73) Assignee: Suki AI, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,665

(22) Filed: Dec. 21, 2023

Related U.S. Application Data (63) Continuation of application No. 18/184,504, filed on Mar. 15, 2023, now Pat. No. 11,875,795, which is a continuation of application No. 17/185,057, filed on Feb. 25, 2021, now Pat. No. 11,615,797, which is a continuation of application No. 16/526,105, filed on Jul. 30, 2019, now Pat. No. 10,971,151.

(51) Int. Cl.
| | |
|---|---|
| *G10L 15/22* | (2006.01) |
| *G06F 3/16* | (2006.01) |
| *G10L 15/08* | (2006.01) |
| *G10L 15/30* | (2013.01) |

(52) U.S. Cl.
CPC .............. *G10L 15/22* (2013.01); *G06F 3/167* (2013.01); *G10L 15/08* (2013.01); *G10L 15/30* (2013.01); *G10L 2015/088* (2013.01); *G10L 2015/223* (2013.01)

(58) Field of Classification Search
CPC ......... G10L 15/22; G10L 15/08; G10L 15/30; G10L 2015/088; G10L 2015/223; G06F 3/167
USPC .......................................................... 704/275
See application file for complete search history.

(56) References Cited

U.S. PATENT DOCUMENTS

| | | | |
|---|---|---|---|
| 10,186,265 B1 * | 1/2019 | Lockhart | G10L 15/32 |
| 2018/0260680 A1 * | 9/2018 | Finkelstein | G06N 5/04 |

(Continued)

*Primary Examiner* — Charlotte M Baker
(74) *Attorney, Agent, or Firm* — Esplin & Associates, PC (57) ABSTRACT

Systems, methods, and storage media for performing actions in response to a determined spoken command of a user are disclosed. Exemplary implementations may: output audio information representing sounds within audible range of a mobile client computing platform in an ongoing manner; cause the audio information to be wirelessly transmitted over a network; receive the audio information transmitted from the mobile client computing platform; perform speech recognition on the audio information to identify any spoken instances of a predetermined keyword; responsive to identification of a spoken instance of the predetermined keyword, identify a spoken command in speech temporally adjacent to the spoken instance of the predetermined keyword that is present in the sounds represented by the audio information; and effectuate transmission of instructions corresponding to the spoken command to the wireless transmitter of the mobile client computing platform to cause the mobile client computing platform to execute the spoken command.

11 Claims, 5 Drawing Sheets

(56) References Cited

U.S. PATENT DOCUMENTS

2020/0175966 A1\* 6/2020 Velayutham ............ G10L 15/26
2020/0196141 A1\* 6/2020 Baker ................... H04W 12/02

\* cited by examiner

SYSTEMS, METHODS, AND STORAGE MEDIA FOR PERFORMING ACTIONS IN RESPONSE TO A DETERMINED SPOKEN COMMAND OF A USER

FIELD OF THE DISCLOSURE

The present disclosure relates to determining spoken commands in response to detection of a spoken instance of a keyword a user, where both detection of the spoken instance of the keyword and the spoken command are performed remotely from the user.

BACKGROUND

Systems performing actions based on spoken commands are known (e.g., Siri, Alexa, Google, etc.). However, the known systems must first detect a wakeword (e.g., "Hey Siri") to initiate further detection of the spoken command. Detection of the wakeword is typically performed on a client device local to the user, and with further processing of the user's speech after detection of the wakeword being performed on a server. The uploading of the user's speech from the client device to the server may be responsive to detection of the wakeword.

SUMMARY

The present disclosure may be related to performing speech detection remotely from a speaker without first detecting a wakeword, and/or without other input from the speaker indicating a spoken command is about to follow. This approach to speech recognition may allow a spoken instance of a predetermined keyword to be present before, in the middle, or after a spoken command from the user. The spoken instance of the predetermined keyword may not be restricted to occurrence in the beginning of a spoken command such that the system must be "awoken". As described herein, a mobile client computing platform associated with the user may transmit audio information representing sound at or near the user to a server in an ongoing manner without needing to be triggered by wakeword detection or other user input. At the server, speech recognition of spoken instances of a predetermined keyword may be performed as audio information representing the sounds is received. Recognition at the server of a spoken instance of the predetermined keyword in the information representing the sounds may cause the server to perform further analysis of the information to identify spoken commands and transmit the commands (and/or actions and/or instructions responsive to the commands) back to the client computing platform.

One aspect of the present disclosure relates to a system configured for performing actions in response to a determined spoken command of a user. The system may include one or more hardware processors configured by machine-readable instructions, an audio recording section, and a wireless transmitter. The audio recording section may be configured to output audio information representing sounds within audible range of a mobile client computing platform in an ongoing manner. The wireless transmitter may be configured to send and receiving information wirelessly through a network. The processor(s) may be configured to cause the audio information to be wirelessly transmitted over a network via the wireless transmitter. The processor(s) may be configured to receive the audio information transmitted from the mobile client computing platform. The processor(s) may be configured to perform speech recognition on the audio information to identify any spoken instances of a predetermined keyword present in the sounds represented by the audio information. The processor(s) may be configured to identify a spoken command in speech temporally adjacent to the spoken instance of the predetermined keyword that is present in the sounds represented by the audio information. The identification of the spoken command may be responsive to the identification of a spoken instance of the predetermined keyword present in the sounds represented by the audio information. The processor(s) may be configured to effectuate transmission of instructions corresponding to the spoken command to the wireless transmitter of the mobile client computing platform. Transmission of the instructions may cause the mobile client computing platform to execute the spoken command.

Another aspect of the present disclosure relates to a method for performing actions in response to a determined spoken command of a user. The method may include outputting audio information representing sounds within audible range of a mobile client computing platform in an ongoing manner. The method may include sending and receiving information wirelessly through a network. The method may include causing the audio information to be wirelessly transmitted over a network via the wireless transmitter. The method may include receiving the audio information transmitted from the mobile client computing platform. The method may include performing speech recognition on the audio information to identify any spoken instances of a predetermined keyword present in the sounds represented by the audio information. The method may include identifying a spoken command in speech temporally adjacent to the spoken instance of the predetermined keyword that is present in the sounds represented by the audio information. The identification of the spoken command may be responsive to then identification of a spoken instance of the predetermined keyword present in the sounds represented by the audio information. The method may include effectuating transmission of instructions corresponding to the spoken command to the wireless transmitter of the mobile client computing platform. The transmission of the instructions may cause the mobile client computing platform to execute the spoken command.

Yet another aspect of the present disclosure relates to a non-transient computer-readable storage medium having instructions embodied thereon, the instructions being executable by one or more processors to perform a method for performing actions in response to a determined spoken command of a user. The method may include outputting audio information representing sounds within audible range of a mobile client computing platform in an ongoing manner. The method may include sending and receiving information wirelessly through a network. The method may include causing the audio information to be wirelessly transmitted over a network via the wireless transmitter. The method may include receiving the audio information transmitted from the mobile client computing platform. The method may include performing speech recognition on the audio information to identify any spoken instances of a predetermined keyword present in the sounds represented by the audio information. The method may include identifying a spoken command in speech temporally adjacent to the spoken instance of the predetermined keyword that is present in the sounds represented by the audio information. The identification of the spoken command may be responsive to the identification of a spoken instance of the predetermined keyword present in the sounds represented by the audio information. The method may include effectuating transmission of instructions corresponding to the spoken command to the wireless transmitter of the mobile client computing platform to cause the mobile client computing platform to execute the spoken command.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
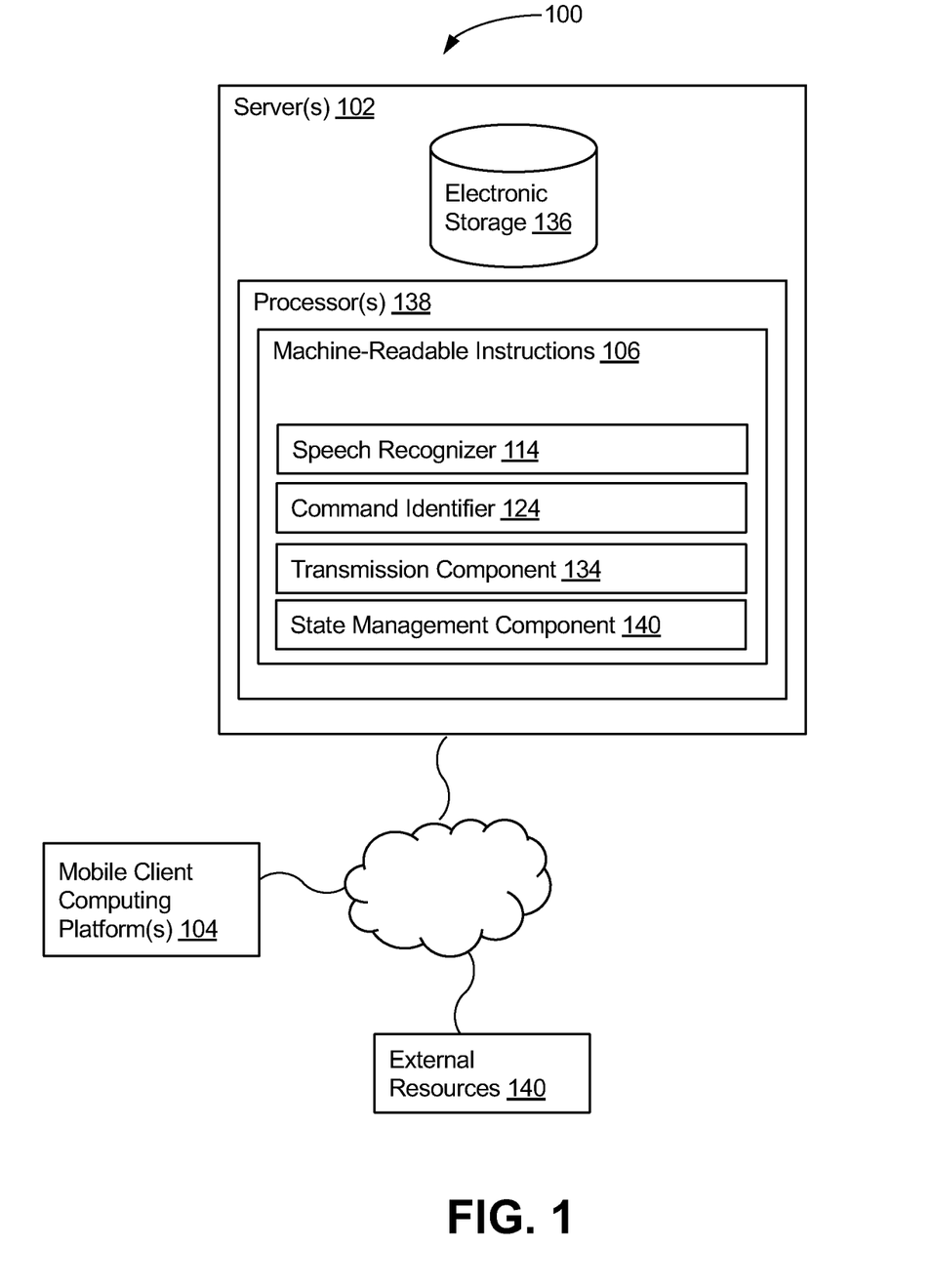
FIG. 1 illustrates a system configured for performing actions in response to a determined spoken command of a user, in accordance with one or more implementations.

FIG. 1 illustrates a system 100 configured for performing actions in response to a determined spoken command of a user, in accordance with one or more implementations. In some implementations, system 100 may include one or more servers 102 and one or more mobile client computing platforms 104. Server(s) 102 may be configured to communicate with the one or more mobile client computing platforms 104 according to a client/server architecture and/or other architectures. Mobile client computing platform(s) 104 may be configured to communicate with other mobile client computing platforms via server(s) 102 and/or according to a peer-to-peer architecture and/or other architectures. Users may access system 100 via client computing platform(s) 104.

Figure 2:
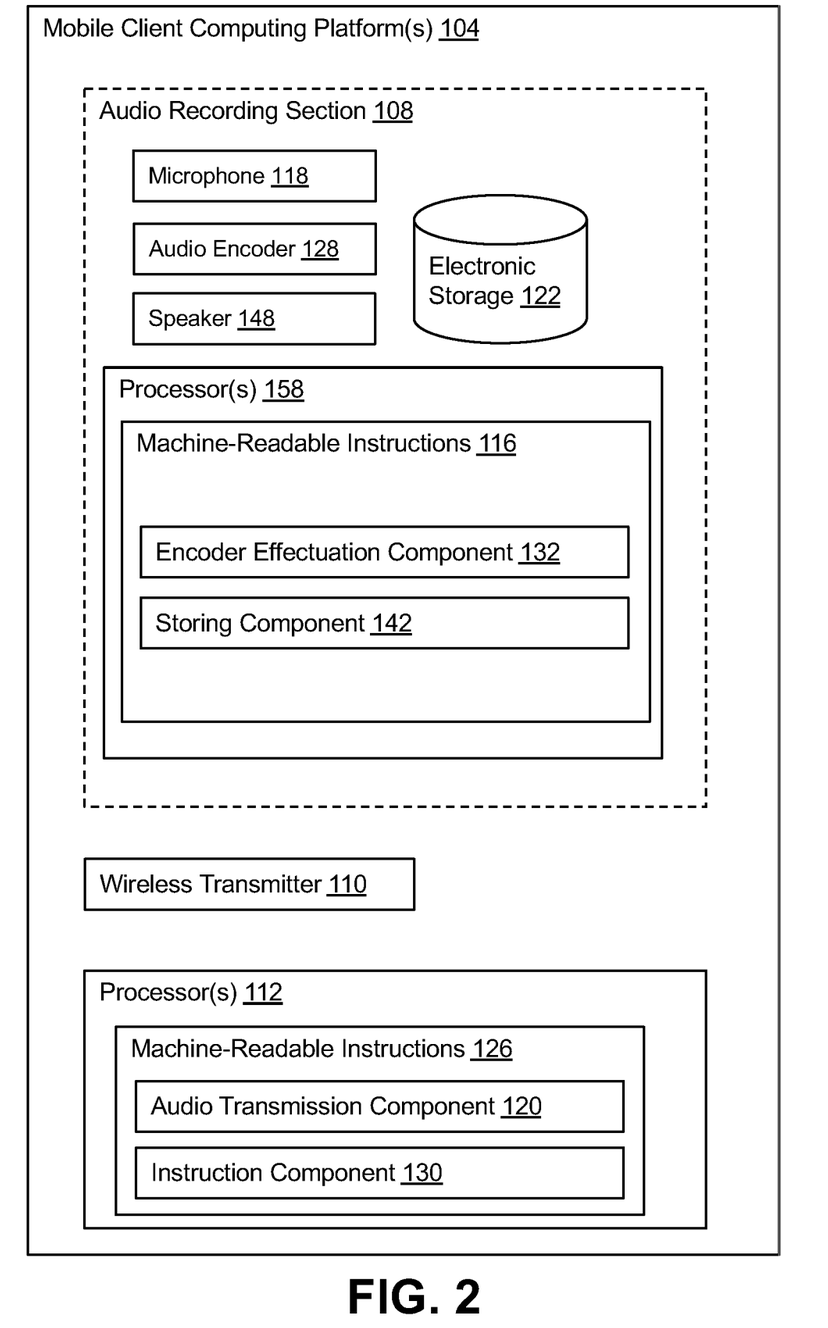
FIG. 2 illustrates a system configured for performing actions in response to a determined spoken command of a user, in accordance with one or more implementations.

FIG. 2 illustrates mobile client computing platform(s) 104. Mobile client computing platform(s) 104 may include audio recording section 108, wireless transmitter 110, one or more physical processors 112, and/or other components.

Wireless transmitter 110 may be configured to send and receiving information wirelessly through a network. Wireless transmitter 110 may include one or more of a wireless local area network (e.g., Wi-Fi™) transmitter, a wireless personal area network (e.g., Bluetooth™) transmitter, a cellular transmitter, and/or other wireless transmitters.

Audio recording section 108 may be configured to output audio information representing sounds within audible range of mobile client computing platform 104 in an ongoing manner. Sounds may be from the voices of users within audible range such that when the users speak, the audio information is recorded. The users may, by way of non-limiting example, include healthcare professionals, teachers, legal professionals, and/or other users. Audible range may, by way of non-limiting example, range from 20 Hz to 2,000 Hz, or other various audible ranges. Audio recording section 108 may be configured to output in an ongoing manner such that the audio information need not being initiated, by other user input, to output the audio information. Other user input may include pressing a button, holding down a button, launching an application, and/or other user input that may initiate output of the audio information.

Audio recording section 108 may include one or more of microphone 118, audio encoder 128, storage 122, speaker 148, and/or processor(s) 158. Processor(s) 158 may be configured by machine-readable instructions 116. Machine-readable instructions 116 may include one or more instruction components. The instruction components may include computer program components. The instruction components may include one or more of encoder effectuation component 132, storing component 142, and/or other instruction components.

Microphone 118 may be configured to detect the sounds represented by the audio information. Microphone 118 may include a single sound sensor or an array of sound sensors. The sound sensor(s) may be configured to convert of the sounds represented by the audio information to digital signals. Converting the sounds represented by the audio information may include converting analog waves to digital signals by precisely measuring the analog waves at consistent and frequent intervals. The digital signals may include noise that is unwanted. The sound sensor(s) may be configured to filter the digital signals of the noise.

Encoder effectuation component 132 may be configured to effectuate audio encoder 128. Audio encoder 128 may encode the digital signals to an audio file according to an audio file format such that the digital signals are compressed. By way of non-limiting example, the audio file format may include apple lossless audio, True Audio (TTA), Free Lossless Audio Code (FLAC), Moving Picture Experts Group Layer-3 (MP3), Advanced Audio Coding (AAC), Waveform Audio File Format (WAV), and/or other audio file formats. Encoder effectuation component 132 may be configured to effectuate audio encoder 128 always, never, for each session of use, when the audio information is determined to have more noise than signal in a signal-to-noise ratio (SNR), when configured to store the audio file, and/or other terms. A session of use may be a period of time in which system 100 may be used to perform actions in response to a determined spoken command of a user. By way of non-limiting example, sessions may include a patient visit, a meeting, a call, a day, a week, and/or other sessions. SNR may be defined as the ratio between signal and noise in which an audio file has more signal than noise with a high SNR.

Storing component 142 may be configured to store the audio file. The audio file may be stored to electronic storage 122 of mobile client computing platform 104. The audio file may be stored in one of the audio file formats. Storing component 142 may be configured to store each audio file of audio information always, never, for each session of use, when the audio information is determined to have more noise than signal in a signal-to-noise ratio (SNR), and/or other terms. Upon storage, storing component 142 may be configured to store the audio file for a specified period of time. The specified period of time may include a day, a week, a month, a year, until manually deleted, until storage is full, and/or other specified periods of time.

Mobile client computing platform(s) 104 may be configured by machine-readable instructions 126. Machine-readable instructions 126 may include one or more instruction components. The instruction components may include computer program components. The instruction components may include one or more of audio transmission component 120, instruction component 130, and/or other instruction components.

Audio transmission component 120 may be configured to cause the audio information to be wirelessly transmitted over a network. The audio information may be wirelessly transmitted prior to performance of speech recognition. Transmission may be via wireless transmitter 110. Audio transmission component 120 may be configured to cause the audio information to be wirelessly transmitted in an ongoing manner without needing to be triggered by wakeword detection or the other user input. The audio information may be wirelessly transmitted immediately subsequent to output of the audio information representing sounds by audio recording section 108.

Instruction component 130 may be configured to receive the instructions corresponding to the spoken command. Instruction component 130 may be configured to effectuate the instructions corresponding to the spoken command. By way of non-limiting example, the spoken command may include taking a note, opening a file, moving a file, deleting a file, duplicating a file, reciting information (e.g., contents of a file), setting a calendar date (e.g., for an appointment, meeting, call, etc.), sending information (e.g., emails, messages, e-invitations, etc.), sending requests, and/or other spoken commands.

Referring back to FIG. 1, server(s) 102 may be configured by machine-readable instructions 106. Machine-readable instructions 106 may include one or more instruction components. The instruction components may include computer program components. The instruction components may include one or more of speech recognizer 114, command identifier 124, Transmission component 134, and/or other instruction components.

Transmission component 134 may be configured to receive the audio information transmitted from the mobile client computing platform.

Speech recognizer 114 may be configured to perform speech recognition on the audio information. The performance of speech recognition may identify any spoken instances of a predetermined keyword present in the sounds represented by the audio information. The predetermined keyword may indicate that the user is stating a spoken command such that the spoken command must be identified. The predetermined keyword may be fixed, interchangeable, and/or there may be more than one predetermined keyword. The predetermined keyword may be set or changed responsive to user selection.

Command identifier 124 may be configured to identify the spoken command in speech. The identification of the spoken command may be responsive to the identification of a spoken instance of the predetermined keyword present in the sounds represented by the audio information. The spoken command in speech may be temporally adjacent to the spoken instance of the predetermined keyword that is present in the sounds represented by the audio information. In some implementations, the spoken instance of the predetermined keyword may precede the spoken command in speech that may be temporally adjacent to the spoken instance of the predetermined keyword present in the sounds represented by the audio information. By way of non-limiting example, "Suki" as the predetermined keyword, "Suki, note that John is allergic to ibuprofen". In some implementations, the spoken instance of the predetermined keyword may be in the middle of the spoken command in speech that is temporally adjacent to the spoken instance of the predetermined keyword present in the sounds represented by the audio information. By way of non-limiting example, "Suki" as the predetermined keyword, "Order blood work, Suki, at Lab three for Jane". In some implementations, the spoken instance of the predetermined keyword may follow the spoken command in speech temporally adjacent to the spoken instance of the predetermined keyword present in the sounds represented by the audio information. By way of non-limiting example, "Suki" as the predetermined keyword, "Set a follow up appointment one week from today for John, Suki". The spoken command identified may have corresponding instructions in which mobile client computing platform 104 may execute.

In some implementations, command identifier 124 may be configured to detect termination of utterance of the spoken command. The detection of termination of the utterance of the spoken command may be based on detecting silence subsequent to the spoken command. The silence may be for a predetermined period of time for the termination of utterance of the spoken command to be detected. The predetermined period of time may be fixed or modifiable by the user. By way of non-limiting example, the utterance of the spoken command may be detected upon silence subsequent to the spoken command reaching five seconds.

Transmission component 134 may be configured to effectuate transmission of the instructions corresponding to the spoken command to the wireless transmitter of the mobile client computing platform. The transmission may cause the mobile client computing platform to execute the spoken command. The instructions may correspond to the action to be performed.

Figure 6:
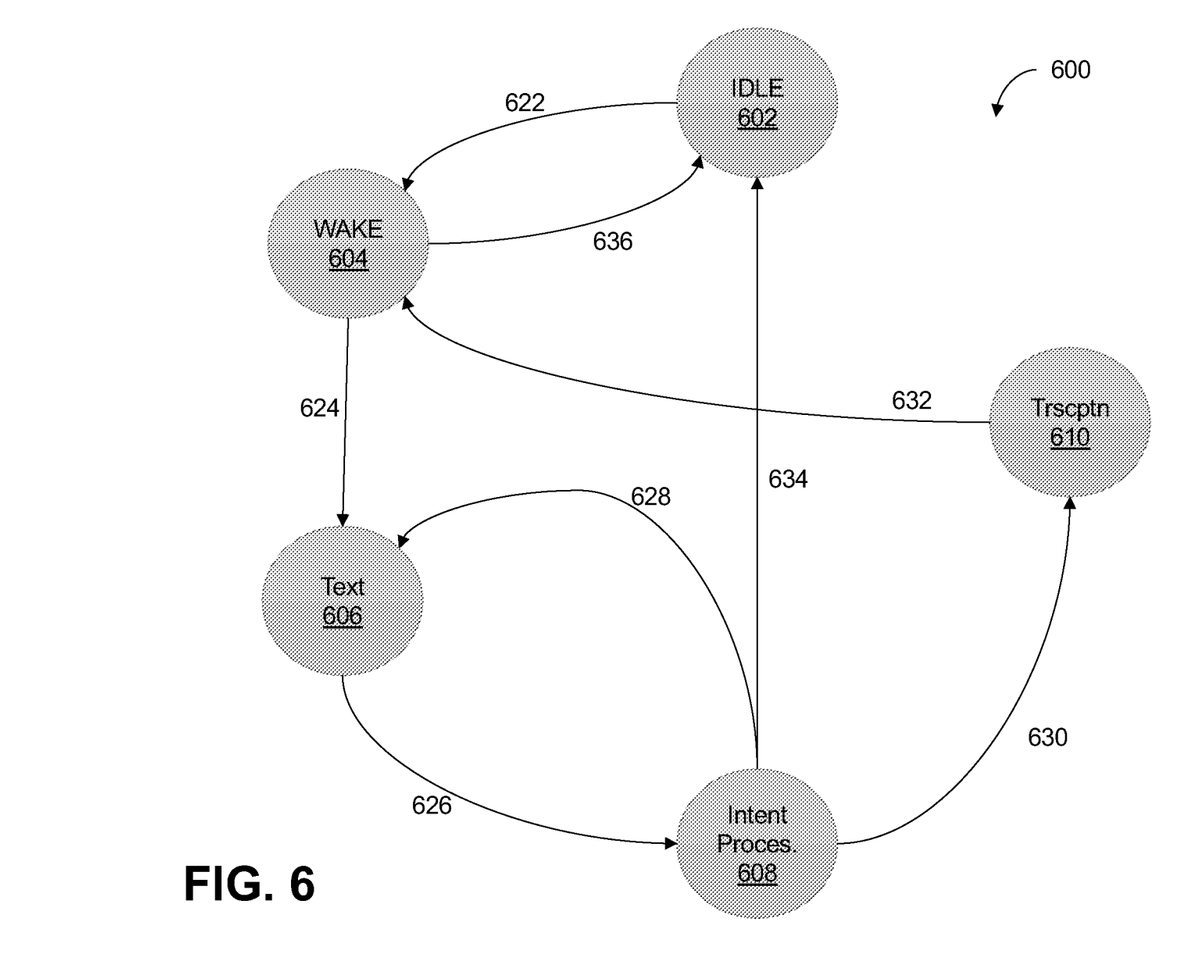
FIG. 6 illustrates an example implementation of a system configured for performing actions in response to a determined spoken command of a user, in accordance with one or more implementations.

State management component 146 may be configured to maintain state of system 100. The states may be synchronized at regular intervals enabling system 100 to have various mobile client computing devices 104 at a minimal cost. FIG. 6 illustrates an example implementation of the system configured to perform actions in response to a determined spoken command of a user, in accordance with one or more implementations. FIG. 6 includes diagram 600 that may represent a comprehensive depiction of system 100 during use by a user. System 100 may begin at state 602 where the system is not currently in use (i.e., idle) by the user. Event 622 may represent identification of any spoken instances of a predetermined keyword present in the sounds represented by the audio information. Upon event 622, system 100 may enter state 604 such that system 100 is active and no longer in an idle state. Event 624 may represent performing speech recognition on the audio information while the user is uttering a spoken command. State 606 may represent comprising the text form of the spoken command based on event 624. Upon detection that the user's utterance of the spoken command has terminated (i.e., event 626), system 100 may begin intent processing. Intent processing may be via various intent extractors and/or other methods of identifying the spoken command. Event 628 represents word-sense disambiguation such that the word-sense of the text form of the spoken command the user is determined. System 100 may repeatedly alternate between state 606 and 608, via events 626 and events 628, such that the spoken command is being identified and transmission of instructions of the spoken command are being transmitted to the wireless transmitter of the mobile client computing platform to cause the mobile client computing platform to execute the spoken command. Event 634 may represent the completion of execution of the spoken command subsequent to state 608. Upon event 634, system 100 may return to state 602 (i.e., idle state) such that system 100 may wait for the predetermined keyword to be present in the audio information again.

Event 636 may represent no identification of a spoken command subsequent to identification of any spoken instances of the predetermined keyword present in the sounds represented by the audio information (e.g., the user does not utter a spoken command after uttering "Suki"). In some implementations, upon event 636, system 100 may return to state 602.

Event 630 may represent system 100 entering transcription mode such that the user (e.g., a doctor) may dictate notes to complete a document (e.g., forms, reports, etc.). Event 630 may occur in response to determining the intent of the spoken command (i.e., state 608) includes transcription dictation. Upon event 630, system 100 may enter state 610. State 610 may represent comprising the completed or partially completed document including the transcription of the dictation from the user. Event 632 may the same as or similar to event 622.

Figure 4:
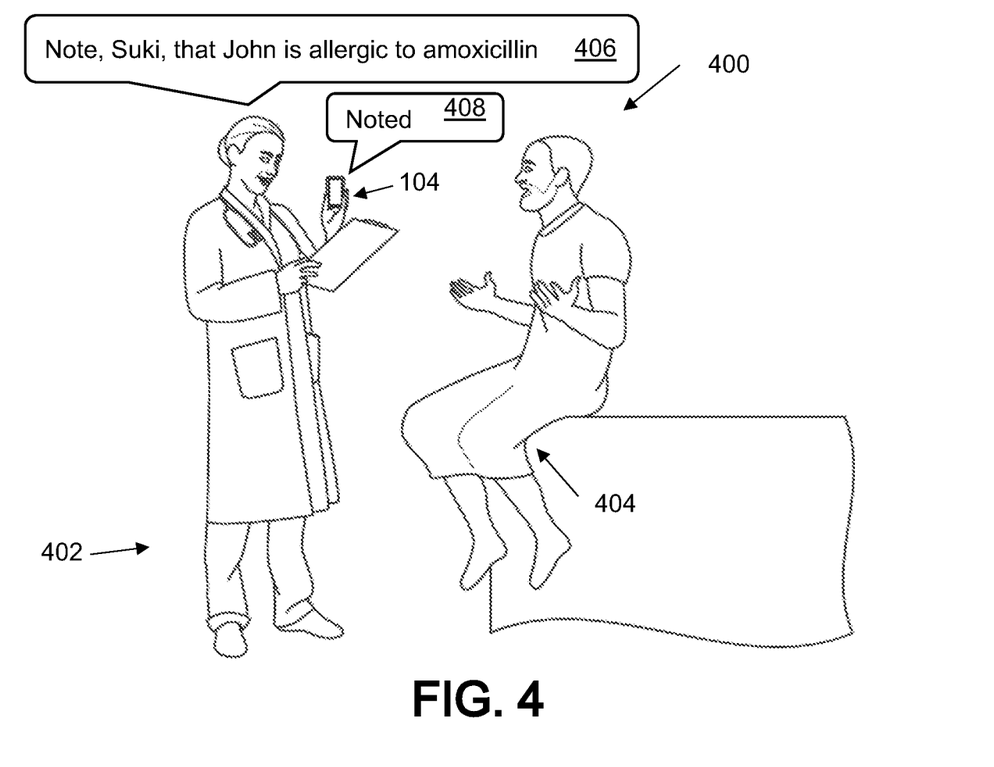
FIG. 4 illustrates an example implementation of a system configured for performing actions in response to a determined spoken command of a user, in accordance with one or more implementations.

FIG. 4 illustrates an example implementation of the system configured to perform actions in response to a determined spoken command of a user, in accordance with one or more implementations. Scenario 400 includes doctor 402, patient 404, and mobile client computing platform 104 of system 100. Mobile client computing platform 104 may be represented by a smartphone. Doctor 402 may be the user of system 100. Patient 404 may convey allergy information to doctor 402 in which doctor 402 says statement 406 to add the allergy information to a corresponding medical record. In some implementations, patient 404 may say statement 406, or a variation thereof. System 100 may receive and process statement 406 such that appropriate instructions to add patient 404's allergy information to the medical record are executed. System 100 may confirm instructions have been executed by executing confirmation 408 via mobile client computing platform 104. Confirmation 408 may be an audible statement (e.g., "Noted in John's record", "Noted", etc.) and/or sound executed via speaker 148.

Figure 5:
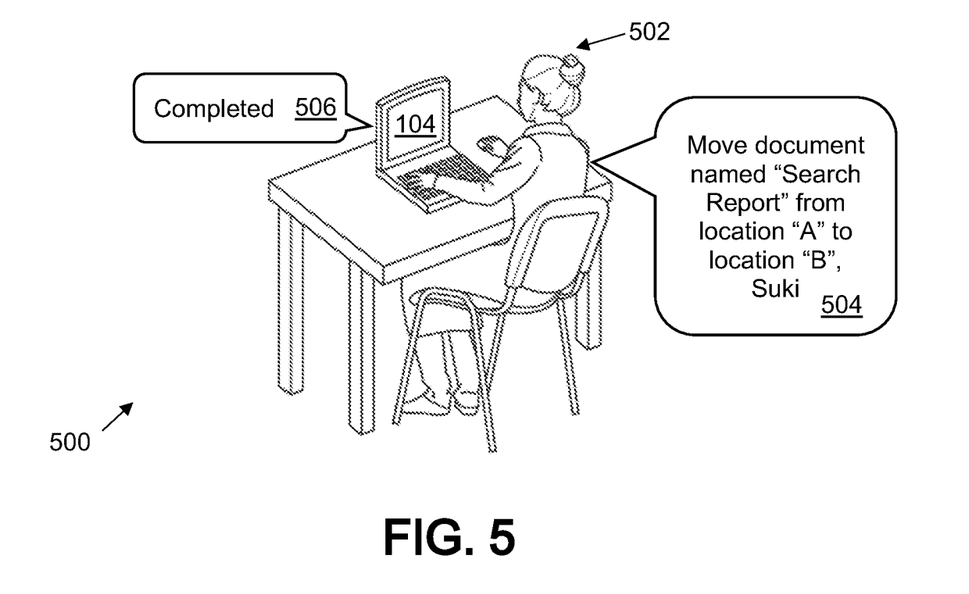
FIG. 5 illustrates an example implementation of a system configured for performing actions in response to a determined spoken command of a user, in accordance with one or more implementations.

FIG. 5 illustrates an example implementation of the system configured to perform actions in response to a determined spoken command of a user, in accordance with one or more implementations. Scenario 500 may be a meeting and include attorney 502 and mobile client computing platform 104 of system 100. Attorney 502 may be the user of system 100. Mobile client computing platform 104 may be represented by a laptop. Attorney 502 may say statement 504 to move a document from one file location to another. System 100 may receive and process statement 504 such that appropriate instructions to change the location of the document are executed. System 100 may confirm instructions have been executed by executing confirmation 506 via mobile client computing platform 104. The audio file corresponding to scenario 500 may be stored in electronic storage. Confirmation 506 may be an audible statement (e.g., "Moved", "Completed", etc.) and/or sound executed via speaker 148.

In some implementations, server(s) 102, mobile client computing platform(s) 104, and/or external resources 140 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, mobile client computing platform(s) 104, and/or external resources 140 may be operatively linked via some other communication media.

A given mobile client computing platform 104 may include one or more processors configured to execute computer program components. The computer program components may be configured to enable an expert or user associated with the given mobile client computing platform 104 to interface with system 100 and/or external resources 140, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 140 may include sources of information outside of system 100, external entities participating with system 100, and/or other resources. In some implementations, some or all of the functionality attributed herein to external resources 140 may be provided by resources included in system 100.

Server(s) 102 may include electronic storage 136, one or more processors 138, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 136 and electronic storage 122 may comprise non-transitory storage media that electronically stores information. The electronic storage media of electronic storage 136 and electronic storage 122 may include one or both of system storage that is provided integrally (i.e., substantially non-removable) with server(s) 102 and mobile client computing platform 104 and/or removable storage that is removably connectable to server(s) 102 and mobile client computing platform 104 via, for example, a port (e.g., a USB port, a firewire port, etc.) or a drive (e.g., a disk drive, etc.). Electronic storage 136 and electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 and electronic storage 122 may include one or more virtual storage resources (e.g., cloud storage, a virtual private network, and/or other virtual storage resources). Electronic storage 136 and electronic storage 122 may store software algorithms, information determined by processor(s) 138 and/or processor(s) 158, information received from server(s) 102, information received from mobile client computing platform(s) 104, and/or other information that enables server(s) 102 and mobile client computing platform(s) 104 to function as described herein.

Processor(s) 112 and 158 may be configured to provide information processing capabilities in mobile client computing platform(s) 104 and processor(s) 138 may be configured to provide information processing capabilities in server(s) 102. As such, processor(s) 112, 138, and 158 may include one or more of a digital processor, an analog processor, a digital circuit designed to process information, an analog circuit designed to process information, a state machine, and/or other mechanisms for electronically processing information. Although processor(s) 112, 138, and 158 are shown in FIGS. 1 and 2 as a single entity, this is for illustrative purposes only. In some implementations, processor(s) 112, 138, and 158 may include a plurality of processing units. These processing units may be physically located within the same device, or processor(s) 112, 138, and 158 may represent processing functionality of a plurality of devices operating in coordination.

Processor(s) 112 may be configured to execute components 120, and/or 130, and/or other components. Processor(s) 138 may be configured to execute components 120 and/or 130, and/or other components by software; hardware; firmware; some combination of software, hardware, and/or firmware; and/or other mechanisms for configuring processing capabilities on processor(s) 112. As used herein, the term "component" may refer to any component or set of components that perform the functionality attributed to the component. This may include one or more physical processors during execution of processor readable instructions, the processor readable instructions, circuitry, hardware, storage media, or any other components. It should be appreciated that although components 120 and/or 130 are illustrated in FIG. 2 as being implemented within a single processing unit, in implementations in which processor(s) 112 includes multiple processing units, one or more of components 120 and/or 130 may be implemented remotely from the other components. The description of the functionality provided by the different components 120 and/or 130 described below is for illustrative purposes, and is not intended to be limiting, as any of components 120 and/or 130 may provide more or less functionality than is described. For example, one or more of components 120 and/or 130 may be eliminated, and some or all of its functionality may be provided by other ones of components 120 and/or 130. As another example, processor(s) 112 may be configured to execute one or more additional components that may perform some or all of the functionality attributed below to one of components 120 and/or 130.

Processor(s) 138 may be configured to execute components 114, 124, and/or 134, and/or other components. Processor(s) 138 may be configured to execute components 114, 124, and/or 134, and/or other components by software; hardware; firmware; some combination of software, hardware, and/or firmware; and/or other mechanisms for configuring processing capabilities on processor(s) 138. It should be appreciated that although components 114, 124, and/or 134 are illustrated in FIG. 1 as being implemented within a single processing unit, in implementations in which processor(s) 138 includes multiple processing units, one or more of components 114, 124, and/or 134 may be implemented remotely from the other components. The description of the functionality provided by the different components 114, 124, and/or 134 described below is for illustrative purposes, and is not intended to be limiting, as any of components 114, 124, and/or 134 may provide more or less functionality than is described. For example, one or more of components 114, 124, and/or 134 may be eliminated, and some or all of its functionality may be provided by other ones of components 114, 124, and/or 134. As another example, processor(s) 138 may be configured to execute one or more additional components that may perform some or all of the functionality attributed below to one of components 114, 124, and/or 134.

Processor(s) 158 may be configured to execute components 132, and/or 142, and/or other components. Processor(s) 158 may be configured to execute components 132 and/or 142, and/or other components by software; hardware; firmware; some combination of software, hardware, and/or firmware; and/or other mechanisms for configuring processing capabilities on processor(s) 158. It should be appreciated that although components 132 and/or 142 are illustrated in FIG. 2 as being implemented within a single processing unit, in implementations in which processor(s) 158 includes multiple processing units, one or more of components 132 and/or 142 may be implemented remotely from the other components. The description of the functionality provided by the different components 132 and/or 142 described below is for illustrative purposes, and is not intended to be limiting, as any of components 132 and/or 142 may provide more or less functionality than is described. For example, one or more of components 132 and/or 142 may be eliminated, and some or all of its functionality may be provided by other ones of components 132 and/or 142. As another example, processor(s) 158 may be configured to execute one or more additional components that may perform some or all of the functionality attributed below to one of components 132 and/or 142.

Figure 3:
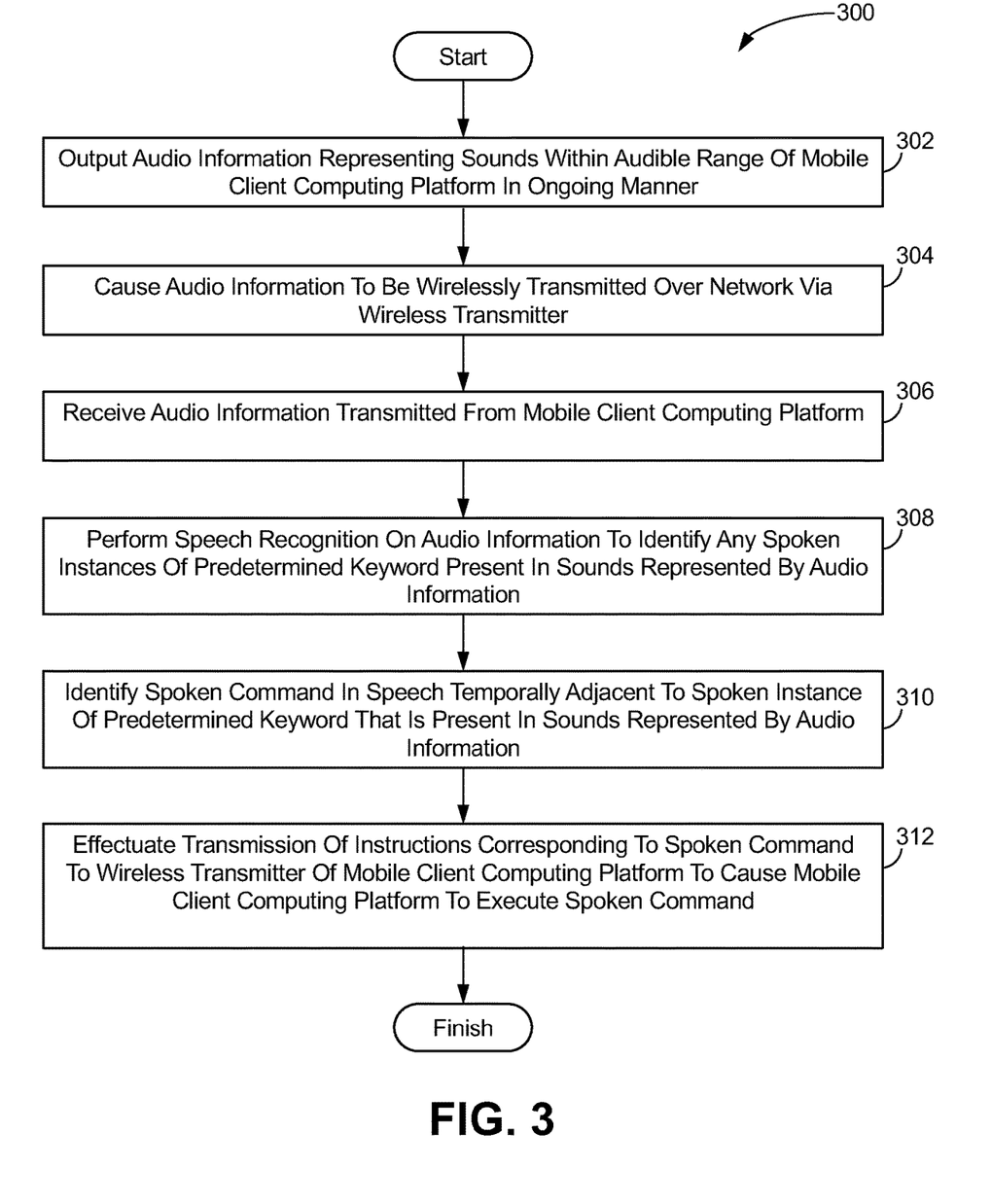
FIG. 3 illustrates a method for performing actions in response to a determined spoken command of a user, in accordance with one or more implementations.

FIG. 3 illustrates a method 300 for performing actions in response to a determined spoken command of a user, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include outputting audio information representing sounds within audible range of a mobile client computing platform in an ongoing manner. Operation 302 may be performed by one or more hardware processors configured by machine-readable instructions including a component that is the same as or similar to audio recording section 108, in accordance with one or more implementations.

An operation 304 may include causing the audio information to be wirelessly transmitted over a network via the wireless transmitter. Operation 304 may be performed by one or more hardware processors configured by machine-readable instructions including a component that is the same as or similar to audio transmission component 120 and/or wireless transmitter 110, in accordance with one or more implementations.

An operation 306 may include receiving the audio information transmitted from the mobile client computing platform. Operation 306 may be performed by one or more hardware processors configured by machine-readable instructions including a component that is the same as or similar to transmission component 134, in accordance with one or more implementations.

An operation 308 may include performing speech recognition on the audio information to identify any spoken instances of a predetermined keyword present in the sounds represented by the audio information. Operation 308 may be performed by one or more hardware processors configured by machine-readable instructions including a component that is the same as or similar to speech recognizer 114, in accordance with one or more implementations.

An operation 310 may include identifying a spoken command in speech temporally adjacent to the spoken instance of the predetermined keyword that is present in the sounds represented by the audio information. Operation 310 may be performed by one or more hardware processors configured by machine-readable instructions including a component that is the same as or similar to command identifier 124, in accordance with one or more implementations.

An operation 312 may include effectuating transmission of instructions corresponding to the spoken command to the wireless transmitter of the mobile client computing platform to cause the mobile client computing platform to execute the spoken command. Operation 312 may be performed by one or more hardware processors configured by machine-readable instructions including a component that is the same as or similar to instruction component 130, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to perform actions in response to a determined spoken command of a user, the system comprising:
    one or more physical computer processors configured by machine-readable instructions to:
        obtain audio information captured by an audio device;
        identify presence of any spoken instances of at least one predetermined keyword from a set of predetermined keywords in the sounds represented by the audio information;
        responsive to identification of a spoken instance of one of the predetermined keywords from the set present in the sounds represented by the audio information, analyze speech temporally adjacent to the spoken instance for a spoken command that is present in the sounds represented by the audio information, wherein the spoken instance precedes, follows, and/or is in the middle of the spoken command;
        identify, based on the analysis, the spoken command; and
        effectuate execution of the spoken command.

2. The system of claim 1 further comprising: an audio encoder and storage.

3. The system of claim 2, wherein the one or more physical computer processors are further configured by the machine-readable instructions to:
    convert sounds represented by the audio information to digital signals, wherein the digital signals include noise;
    filter the digital signals of the noise;
    effectuate the audio encoder to encode the digital signals to an audio file according to an audio file format; and
    store, in the storage, the audio file.

4. The system of claim 3, wherein the audio file format includes Apple Lossless Audio, TTA, FLAC, Mp3, and AAC.

5. The system of claim 1, wherein the spoken command includes taking a note, opening a file, reciting information, setting a calendar date, sending information, and/or sending requests.

6. The system of claim 1, wherein effectuating execution of the spoken command includes:
    effectuating transmission of instructions corresponding to the spoken command to a mobile client computing platform to cause the mobile client computing platform to execute the spoken command.

7. A method for performing actions in response to a determined spoken command of a user, the method comprising:
    obtaining audio information captured by an audio device;
    identifying presence of any spoken instances of at least one predetermined keyword from a set of predetermined keywords in the sounds represented by the audio information;
    responsive to identification of a spoken instance of one of the predetermined keywords from the set present in the sounds represented by the audio information, analyze speech temporally adjacent to the spoken instance for a spoken command that is present in the sounds represented by the audio information, wherein the spoken instance precedes, follows, and/or is in the middle of the spoken command;
    identify, based on the analysis, the spoken command; and
    effectuating execution of the spoken command.

8. The method of claim 7, further comprising:
    converting sounds represented by the audio information to digital signals, wherein the digital signals include noise;
    filtering the digital signals of the noise;
    effectuating an audio encoder to encode the digital signals to an audio file according to an audio file format; and
    storing, in a storage, the audio file.

9. The method of claim 8, wherein the audio file format includes Apple Lossless Audio, TTA, FLAC, Mp3, and AAC.

10. The method of claim 7, wherein the spoken command includes taking a note, opening a file, reciting information, setting a calendar date, sending information, and/or sending requests.

11. The method of claim 7, wherein effectuating execution of the spoken command includes:

effectuating transmission of the instructions corresponding to the spoken command to a mobile client computing platform to cause the mobile client computing platform to execute the spoken command.

\* \* \* \* \*